(12) United States Patent
Chen (10) Patent No.: US 10,782,552 B2
(45) Date of Patent: Sep. 22, 2020

(54) DISPLAY PANEL AND DISPLAY DEVICE

(71) Applicant: Shenzhen China Star Optoelectronics Technology Co., Ltd., Shenzhen, Guangdong (CN)

(72) Inventor: Lixuan Chen, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 36 days.

(21) Appl. No.: 15/764,950

(22) PCT Filed: Jan. 4, 2018

(86) PCT No.: PCT/CN2018/071456
§ 371 (c)(1),
(2) Date: Mar. 30, 2018

(87) PCT Pub. No.: WO2019/024434
PCT Pub. Date: Feb. 7, 2019

(65) Prior Publication Data
US 2019/0041692 A1    Feb. 7, 2019

(30) Foreign Application Priority Data
Aug. 1, 2017    (CN) .......................... 2017 1 0647060

(51) Int. Cl.
*G02F 1/1337*    (2006.01)
*G02F 1/1333*    (2006.01)
(Continued)

(52) U.S. Cl.
CPC .. *G02F 1/133514* (2013.01); *G02F 1/133528* (2013.01); *G02F 1/133602* (2013.01);
(Continued)

(58) Field of Classification Search
None
See application file for complete search history.

(56) References Cited

U.S. PATENT DOCUMENTS

2005/0270449 A1* 12/2005 Koma ............... G02F 1/133371
349/114
2008/0117377 A1* 5/2008 Chan ..................... G02F 1/1339
349/153
(Continued)

FOREIGN PATENT DOCUMENTS

| CN | 101673007 A | 3/2010 | |
| CN | 105204103 A | * 12/2015 | ............... G02B 5/20 |

(Continued)

*Primary Examiner* — Edward J Glick
*Assistant Examiner* — Anthony G Quash
(74) *Attorney, Agent, or Firm* — Leong C. Lei (57) ABSTRACT

A display panel includes, arranged as a stack, a color filter layer, a function layer, and a liquid crystal layer. The function layer has a top and a bottom opposite to each other. The color filter layer is arranged on the top, and the color filter layer includes a blue sub-pixel zone for transmission of blue light. The liquid crystal layer is arranged on the bottom. The bottom is provided with a protrusion structure, and the protrusion structure extends into the liquid crystal layer such that the protrusion structure divides the liquid crystal layer into a first area and a second area. The first area has a projection cast on the color filter layer and having an area covering the blue sub-pixel zone. A liquid crystal cell thickness of the first area is smaller than a liquid crystal cell thickness of the second area. Also provided is a display device.

16 Claims, 4 Drawing Sheets

(51) Int. Cl.
*G02F 1/1335* (2006.01)
*G02F 1/13357* (2006.01)
*G02F 1/015* (2006.01)
*G02F 1/01* (2006.01)

(52) U.S. Cl.
CPC .......... *G02F 1/133617* (2013.01); *G02F 2001/133357* (2013.01); *G02F 2001/133614* (2013.01); *G02F 2202/36* (2013.01)

(56) References Cited

U.S. PATENT DOCUMENTS

| | | | | |
|---|---|---|---|---|
| 2009/0135352 A1* | 5/2009 | Suzuki | .............. | G02F 1/133514 349/106 |
| 2010/0066952 A1* | 3/2010 | Tsuchiya | ........... | G02F 1/133514 349/106 |
| 2011/0279475 A1 | 11/2011 | Ikenoue | | |
| 2016/0363821 A1* | 12/2016 | Lee | .................. | G02F 1/134309 |

FOREIGN PATENT DOCUMENTS

| | | | | |
|---|---|---|---|---|
| CN | 106249464 A | | 12/2016 | |
| CN | 106249465 A | | 12/2016 | |
| CN | 106773306 A | | 5/2017 | |
| CN | 107219673 A | | 9/2017 | |
| JP | 2008122799 A | * | 5/2008 | .............. G02B 5/20 |
| JP | 2008122799 A | | 5/2008 | |

* cited by examiner

DISPLAY PANEL AND DISPLAY DEVICE

CROSS REFERENCE TO RELATED APPLICATIONS

This application claims the priority of Chinese Patent Application No. 201710647060.6 filed on Aug. 1, 2017, titled "Display Panel and Display Device", the disclosure of which is incorporated herein by reference in its entirety.

BACKGROUND OF THE INVENTION

1. Field of the Invention

The present invention relates to the field of liquid crystal display technology, and more particularly to a display panel including a quantum-dot color filter layer and a display device including the display panel.

2. The Related Arts

Coloring of a liquid crystal display is realized with a color filter (CF). However, the known color filters suffer power light utilization and low transmittance, and in addition, a traditional color resist material has a relatively wide transmission peak and limited chrominance so that it is hard to realize wide gamut, making it not satisfying the requirements of users for image quality. Quantum dots (QDs) are hemispheric nanometer particulates made of elements of Groups II-V1 or III-V, having a particle size that is around several nanometers and tens of nanometers. A quantum dot material has a relatively small width at half maximum for a light emission peak thereof and color of light emission may be easily adjusted by means of the size, structure, or composition of the quantum dot material so that the application thereof to a display device would help effectively improve color saturation and color gamut of the display device.

The quantum dot material absorbs blue light of short wave to be excited thereby to give off light color light in a long wave band. Such a characteristic allows blue light emitting from a blue backlight source to displays colors, such as red and green, after being projected to a quantum dot material. A quantum-dot color filter layer that is currently known is divided into a blue sub-pixel zone, a red sub-pixel zone, and a green sub-pixel zone. Among these zones, the red sub-pixel zone and the green sub-pixel zone are filled with quantum dot materials, such that the quantum dot materials allow a user to perceive red light or green light at any angle, while the blue sub-pixel zone is often filled with a transparent material or has no filling at all for the purpose of transmission of blue light therethrough. This often results in viewing angle related color shift problems in the blue pixel zone. Also, the blue light emitting from the blue sub-pixel zone in a front view is relatively intense and may cause certain damage to the eyes of a user.

SUMMARY OF THE INVENTION

In view of the above problem, an object of this application is to provide a display panel and a display device that help alleviate the issue of viewing angle related color shifting in a blue sub-pixel zone and also reduce the blue light intensity emitting from the blue sub-pixel zone in a front view.

In order to overcome the deficiencies existing in the background art, in one aspect, this application provides a display panel, which comprises, arranged as a stack, a color filter layer, a function layer, and a liquid crystal layer, wherein the function layer has a top and a bottom that are opposite to each other; the color filter layer is arranged on the top, and the color filter layer comprises a blue sub-pixel zone for transmission of blue light; the liquid crystal layer is arranged on the bottom; the bottom is provided with a protrusion structure, and the protrusion structure extends into the liquid crystal layer such that the protrusion structure divides the liquid crystal layer into a first area and a second area, the first area having a projection cast on the color filter layer and having an area covering the blue sub-pixel zone, a liquid crystal cell thickness of the first area being smaller than a liquid crystal cell thickness of the second area.

In the above, the protrusion structure comprises a light transmitting structure for transmission of blue light therethrough.

In the above, the first area has a projection cast on the color filter layer and having a surface area corresponding to a surface area of the blue sub-pixel zone.

In the above, the liquid crystal cell thickness of the first area is 0.2-0.5 times of the liquid crystal cell thickness of the second area.

In the above, the function layer comprises a transparent conductive film layer, and the transparent conductive film layer is arranged on one side adjacent to the liquid crystal layer, the protrusion structure and the transparent conductive film layer being made of the same material.

In the above, the function layer further comprises a polarization layer, and the polarization layer has a first top wall facing the liquid crystal layer, the first top wall being provided thereon with a first raised block, the first raised block extending toward the liquid crystal layer, the first raised block having a first circumferential surface connected to the first top wall, the function layer further comprising a transparent conductive film layer, the transparent conductive film layer being set on and covering the first circumferential surface to form the protrusion structure.

In the above, the function layer further comprises a planarization layer, and the planarization layer comprises as second top wall facing the liquid crystal layer, the second top wall being provided thereon with a second raised block, the second raised block extending toward the liquid crystal layer, the second raised block having a second circumferential surface connected to the second top walt the function layer further comprising, arranged as a stack, a transparent conductive film layer and a polarization layer, the polarization layer covering the second circumferential surface, the transparent conductive film layer covering the polarization layer to form the protrusion structure.

In the above, the first area has a projection cast on the color filter layer and having a surface area corresponding to a surface area of the blue sub-pixel zone.

In the above, the color filter layer further comprises a green sub-pixel zone and a red sub-pixel zone, the green sub-pixel zone being filled with a first quantum dot material, such that the first quantum dot material, upon excitation by the blue light, emits green light, the red sub-pixel zone being filled with a second quantum dot material, such that the second quantum dot material, upon excitation by the blue light, emits red light.

In the above, the display panel further comprises a thin-film transistor layer and a backlight source, the thin-film transistor layer being arranged on one side of the liquid crystal layer that is distant from the function layer, the backlight source being arranged on one side of the thin-film transistor layer that is distant from the liquid crystal layer, the backlight source emitting the blue light.

In another aspect, this application provides a display device, which comprises a display panel, the display panel comprising, arranged as a stack, a color filter layer, a function layer, and a liquid crystal layer, wherein the function layer has a top and a bottom that are opposite to each other; the color filter layer is arranged on the top, and the color filter layer comprises a blue sub-pixel zone for transmission of blue light; the liquid crystal layer is arranged on the bottom; the bottom is provided with a protrusion structure, and the protrusion structure extends into the liquid crystal layer such that the protrusion structure divides the liquid crystal layer into a first area and a second area, the first area having a projection cast on the color filter layer and having an area covering the blue sub-pixel zone, a liquid crystal cell thickness of the first area being smaller than a liquid crystal cell thickness of the second area.

Compared to the prior art, this application provides a display panel, which possesses at least the following advantages:

Due to the arrangement of the protrusion structure at a location corresponding to the blue sub-pixel zone, the protrusion structure takes a predetermined amount of the thickness of the liquid crystal layer so that the cell thickness of the liquid crystal layer corresponding to the blue sub-pixel zone is smaller than the cell thickness of the liquid crystal layer corresponding to the red sub-pixel zone and the green sub-pixel zone so as to improve the issue of viewing angle related color shifting of the blue sub-pixel zone. Further, the cell thickness of the liquid crystal layer corresponding to the blue sub-pixel zone is reduced so that the amount of the blue light transmitting in the liquid crystal layer is reduced to thereby, on the one hand, reduce the amount of mixture of the blue light in the red sub-pixel zone and the green sub-pixel zone to further improve the issue of viewing angle related color shifting, and on the other hand, reduce the intensity of the blue light projecting from the display panel in a front view to reduce damage caused on the eyes of the user by the blue light.

BRIEF DESCRIPTION OF THE DRAWINGS

To more clearly explain the technical solution proposed in embodiments of this application, a brief description of the drawings that are necessary for describing the embodiments will be given below. It is obvious that the drawings that will be described below show only some embodiments of this application. For those having ordinary skills of the art, other drawings may be readily available from these attached drawings without the expense of creative effort and endeavor.

DETAILED DESCRIPTION OF THE PREFERRED EMBODIMENTS

A clear and complete description will be given to technical solutions provided in the embodiments of this application with reference to the attached drawings of the embodiments of this application.

Figure 1:
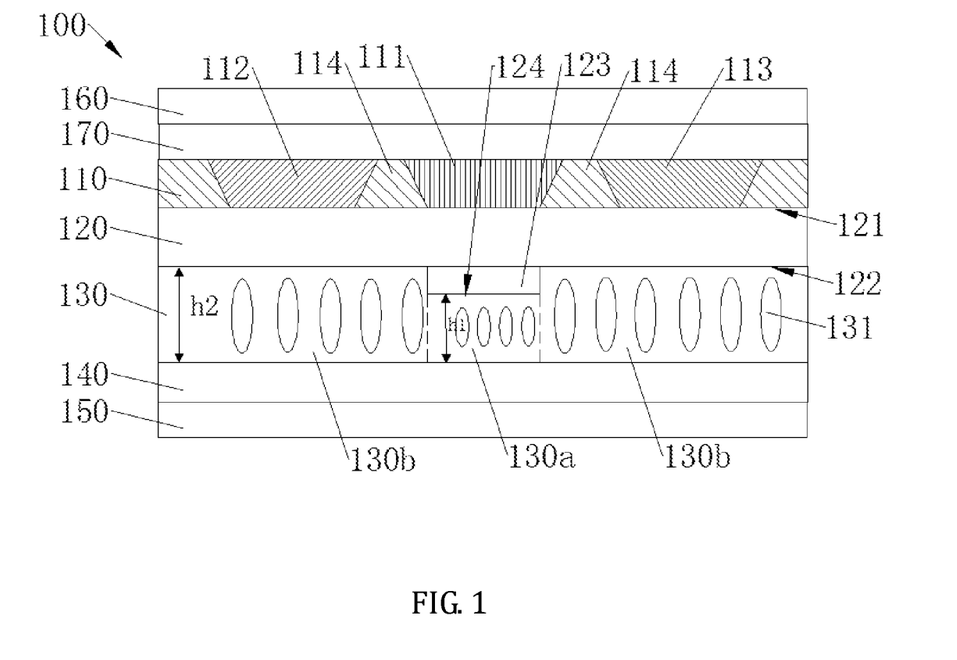
FIG. 1 is a schematic view illustrating a structure of a display panel provided in embodiments of this application.

Referring to FIG. 1, FIG. 1 shows a display panel 100 according to the embodiments of this application. The display panel 100 comprises, arranged as a stack, a color filter layer 110, a function layer 120, a liquid crystal layer 130, and a thin-film transistor layer 140. The function layer 120 has a top 121 and a bottom 122 that are opposite to each other. The color filter layer 110 is arranged on the top 121, and the color filter layer 110 comprises a blue sub-pixel zone 111 for transmission of blue light. The liquid crystal layer 130 is arranged on the bottom 122 and contains liquid crystal molecules 131. The thin-film transistor layer 140 is arranged on one side of the liquid crystal layer 130 that is distant from the function layer 120. The bottom 122 is provided with a protrusion structure 123, and the protrusion structure 123 extends into the liquid crystal layer 130. The protrusion structure 123 divides the liquid crystal layer 130 into a first area 130a and a second area 130b. A projection of the first area 130a cast on the color filter layer 110 has an area covering the blue sub-pixel zone 111. The first area 130a has a liquid crystal cell thickness that is smaller than a liquid crystal cell thickness of the second area 130b. Specifically, the protrusion structure 123 comprises a top wall 124, and the top wall 124 is arranged to face the liquid crystal layer 130. The liquid crystal cell thickness of the first area 130a is a distance from the top wall 124 to the thin-film transistor layer 140 and is referred to as a first spacing distance h1. The liquid crystal cell thickness of the second area 130b is a distance from the bottom 122 to the thin-film transistor layer 140 and is referred to as a second spacing distance h2.

In the instant embodiment, the color filter layer 110 further comprises a green sub-pixel zone 112 and a red sub-pixel zone 113. The green sub-pixel zone 112 and the red sub-pixel zone 113 are arranged adjacent to the blue sub-pixel zone 111 and are respectively set at two opposite sides of the blue sub-pixel zone 111, wherein the green sub-pixel zone 112 is filled with a first quantum dot material and the first quantum dot material, upon excitation by blue light, gives off green light; and the red sub-pixel zone 113 is filled with a second quantum dot material and the second quantum dot material, upon excitation by blue light, gives off red light. A light-blocking zone 114 is arranged among the red sub-pixel zone 113, the green sub-pixel zone 112, and the blue sub-pixel zone 111. The light-blocking zone 114 can be metal chromium, acrylic resin, or a black resin, for blocking light and is also referred to as a black matrix.

In addition, the display panel 100 further comprises a backlight source 150, and the backlight source 150 is arranged on one side of the thin-film transistor layer 140 that is distant from the liquid crystal layer 130. The backlight source 150 emits blue light. The blue light irradiates the green sub-pixel zone 112, the red sub-pixel zone 113, and the blue sub-pixel zone 111, such that the first quantum dot material receives the blue light to have the green sub-pixel zone 112 emitting the green light and the second quantum dot material receives the blue light to have the red sub-pixel zone 113 emitting the red light. Since quantum dot materials are electroluminescent, it is possible to improve a viewing angle of light projection so that the green sub-pixel zone 112 and the red sub-pixel zone 113 do not suffer viewing angle related color shifting issues.

The blue light transmits through the liquid crystal layer 130 and projects onto the blue sub-pixel zone 111. The blue sub-pixel zone 111 is provided with a light transmitting material for transmission of the blue light. Since the blue sub-pixel zone 111 includes no quantum dot material, if a light exit angle of the blue light projecting to the blue sub-pixel zone 111 is not variable, then viewing angle related color shifting may occur in the blue sub-pixel zone 111 of the display panel 100; and the intensity of the exit blue light is also high, this being susceptible to cause damage to the eyes of users.

Since the wavelength of blue light is shorter than the wavelengths of red light and green light, the cell thickness necessary for the blue sub-pixel zone 111 is smaller than the cell thicknesses necessary for the red sub-pixel zone 113 and the green sub-pixel zone 112. Setting the cell thickness of the blue sub-pixel zone 111 to be smaller than the cell thicknesses of the red sub-pixel zone 113 and the green sub-pixel zone 112 would make the blue sub-pixel zone 111 form a proper cell thickness difference with respect to the red sub-pixel zone 113 and the green sub-pixel zone 112 thereby improving the issue of viewing angle related color shifting of the blue sub-pixel zone 111 and enhancing the displaying quality of the liquid crystal display panel 100.

In the instant embodiment, due to the arrangement of the protrusion structure 123 at a location corresponding to the blue sub-pixel zone 111, the protrusion structure 123 takes a predetermined amount of the thickness of the liquid crystal layer 130 so that the cell thickness of the liquid crystal layer 130 corresponding to the blue sub-pixel zone 111 is smaller than the cell thickness of the liquid crystal layer 130 corresponding to the red sub-pixel zone 113 and the green sub-pixel zone 112 so as to improve the issue of viewing angle related color shifting of the blue sub-pixel zone 111. Further, the cell thickness of the liquid crystal layer 130 corresponding to the blue sub-pixel zone 111 is reduced so that the amount of the blue light transmitting in the liquid crystal layer 130 is reduced to thereby, on the one hand, reduce the amount of mixture of the blue light in the red sub-pixel zone 113 and the green sub-pixel zone 112 to further improve the issue of viewing angle related color shifting, and on the other hand, reduce the intensity of the blue light projecting from the display panel 100 in a front view to reduce damage caused on the eyes of the user by the blue light.

Optionally, the first quantum dot material and the second quantum dot material are each selected from quantum dot materials of Group II-VI or Group III-V, and are preferably each selected as one or a combination of multiple ones of materials including CdS, CdSe, CdTe, and ZnS. These semiconductor quantum dots all follow the quantum dot size effect and have energy levels that vary with variation of the quantum dot size and properties that also vary with variation of the quantum dot size, such as absorption and emission of luminous intensity being variable with size variation, so that it is possible to control the emissive luminous intensity by changing the size thereof. Through controlling the size of the quantum dot, it is possible to emit, through excitation, monochromic red light having a wavelength of 630-720 nm and monochromic green light having a wavelength of 500-560 nm.

The color filter layer 110 fabricated with the above-described way of manufacturing of the color filter layer 110 can be used in combination with blue backlight so that the red and the green sub-pixel zones 112 of the color filter layer 110 are respectively formed with red and green patterns, which, upon excitation by the blue light, would make the red and green patterns emitting red light and green light, respectively, and the blue light emitting from the backlight source 110 is allowed to transmit through the blue sub-pixel zone 111 to display blue light, thereby realizing displaying of three primary colors of red, green, and blue.

In the instant embodiment, the protrusion structure 123 is a light transmitting structure for transmission of the blue light therethrough so as to allow the blue light, after passing through the liquid crystal layer 130, to transmit through the protrusion structure 123 to project onto the blue sub-pixel zone 111.

This application provides no constraint to the size and shape of the protrusion structure 123. Preferably, the protrusion structure 123 has a projection cast on the color filter layer 110 and having an area equal to a surface area of the blue sub-pixel zone 111.

Optionally, the liquid crystal cell thickness of the first area is 0.2-0.5 times of the liquid crystal cell thickness of the second area. If the difference between the liquid crystal cell thickness of the first area and the liquid crystal cell thickness of the second area is excessively large, transmittance of blue light would become relatively small, making it disadvantageous for heightening image quality of the display panel 100 and the fabrication operation would be of great difficulty. If the difference between the liquid crystal cell thickness of the first area and the liquid crystal cell thickness of the second area is excessively small, then transmittance of blue light can be kept relatively large, but the issue of viewing angle related color shifting of the display panel 100 cannot be well improved.

Figure 2:
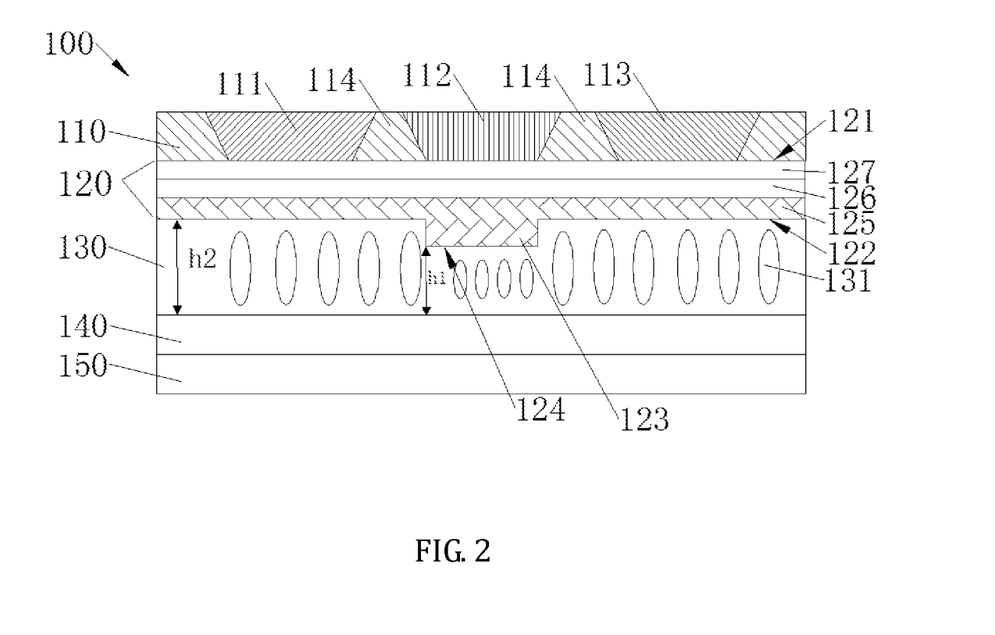
FIG. 2 is a schematic view illustrating a structure of a display panel provided in a first example embodiment of this application.
Figure 3:
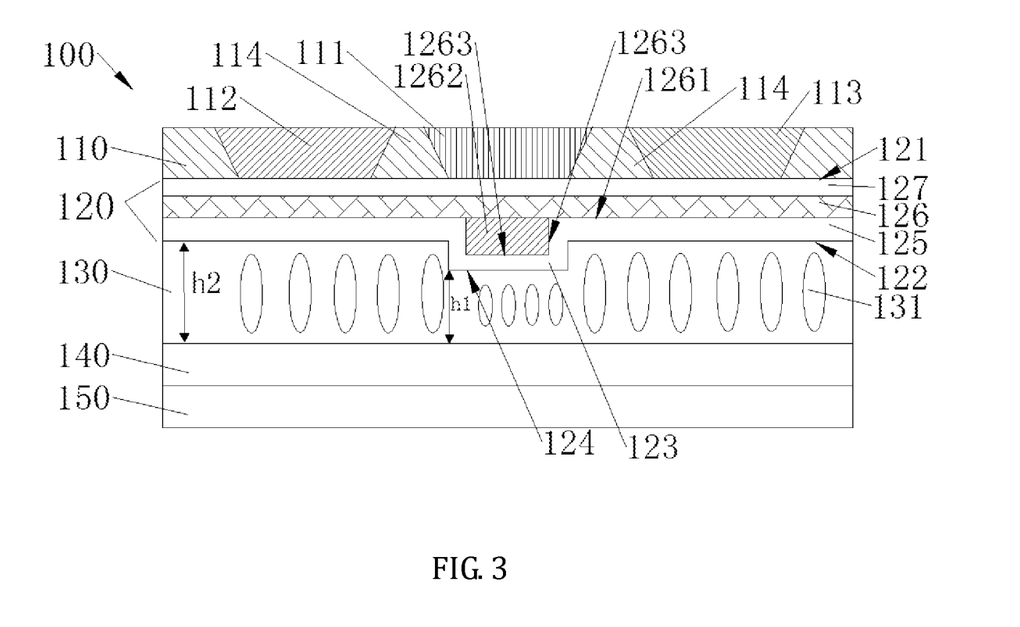
FIG. 3 is a schematic view illustrating a structure of a display panel provided in a second example embodiment of this application.
Figure 4:
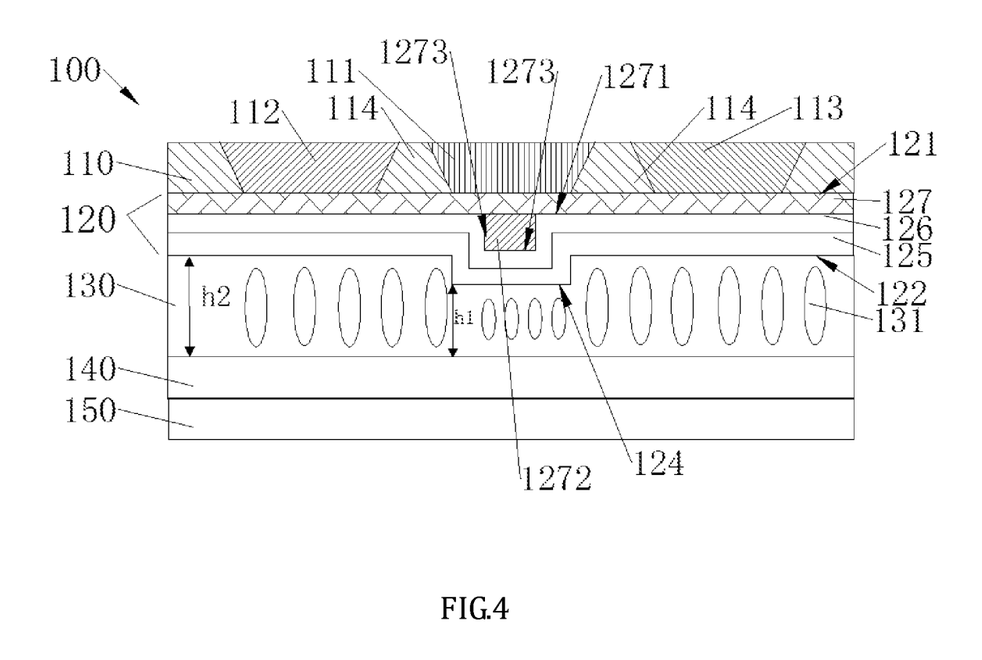
FIG. 4 is a schematic view illustrating a structure of a display panel provided in a third example embodiment of this application.

Optionally, referring to FIGS. 2-4, the function layer 120 comprises, arranged in a stack, a transparent conductive film layer 125, a polarization layer 126, and a planarization layer 127. The polarization layer 126 is arranged between the liquid crystal layer 130 and the color filter layer 110.

In the instant embodiment, the polarization layer 126 is arranged between the liquid crystal layer 130 and the color filter layer 110 and this is an internalized polarization layer 126. This is because the mechanism with which the quantum dot material generates color is electroluminescence and this causes influence on the transmission of polarized light of the display panel 100. By arranging the polarization layer 126 of the side associated with the color filter layer 110 at a location between the color filter layer 110 and the liquid crystal layer 130, it is possible to prevent displaying from being affected by the polarized light being converted into partly polarized light after passing through the color filter layer 110.

Optionally, the transparent conductive film layer 125 is arranged on one side that is adjacent to the liquid crystal layer 130. The planarization layer 127 is arranged on one side that is adjacent to the color filter layer 110. The polarization layer 126 is arranged between the transparent conductive film layer 125 and the planarization layer 127. The planarization layer 127 covers the color filter layer 110. Since the quantum dot material is sensitive to moisture and oxygen, it is necessary to place the planarization layer 127 between the polarization layer 126 and the color filter layer 110 to encapsulate the quantum dot material for protection of the quantum dot material against oxidization.

This application places no constraints to the material and fabrication of the protrusion structure 123. Some example embodiments are provided for illustrating the material and fabrication of the protrusion structure 123. This application, although comprising, is not imitated to the following example embodiments.

First Example Embodiment

Referring to FIG. 2, the protrusion structure 123 and the transparent conductive film layer 125 are formed of materials that are identical. The transparent conductive film layer 125 is formed of a material comprising metal oxides, such as indium tin oxides, indium zinc oxides, aluminum tin oxides, aluminum zinc oxides, indium germanium zinc oxides, other suitable oxides, or a stacked layer of at least two of the above.

Optionally, the protrusion structure 123 can be formed in a process of manufacturing the transparent conductive film layer 125, such that a patterned transparent conductive film layer 125 is formed. With the basic structure of the color filter layer 110, after the encapsulation and operations associated with the planarization layer 127 and the polarization layer 126, a transparent photoresist structure having inconsistent heights is formed on the polarization layer 126 and the height-inconsistent transparent photoresist structure can be formed with a photolithographic operation, such that a transparent conductive film layer 125 that includes a protrusion structure 123 can be formed.

Second Example Embodiment

Referring to FIG. 3, the polarization layer 126 has a first top wall 1261 facing the liquid crystal layer 130. The first top wall 1261 is provided thereon with a first raised block 1262. The first raised block 1262 projects in a direction toward the liquid crystal layer 130. The first raised block 1262 has a first circumferential surface 1263 connected to the first top wall 1261. The function layer 120 further comprises the transparent conductive film layer 125. The transparent conductive film layer 125 is set on and covers the first circumferential surface 1263 to form the protrusion structure 123. In other words, the protrusion structure 123 is made up of the first raised block 1262 and the transparent conductive film layer 125 that is arranged on the first circumferential surface 1263 of the first raised block 1262.

Optionally, the first raised block 1262 can be made of a material that is the same as or different from a material of the polarization layer 126. For the first raised block 1262 and the polarization layer 126 being made of the same material, the first raised block 1262 can be formed in a process of manufacturing the polarization layer 126 to provide a patterned polarization layer 126. With the basic structure of the color filter layer 110, after the encapsulation and an operation associated with the planarization layer 127, a transparent photoresist structure having inconsistent heights is formed on the planarization layer 127 and the height-inconsistent transparent photoresist structure can be formed with a photolithographic operation, such that a polarization layer 126 that includes a first raised block 1262 can be formed.

Third Example Embodiment

Referring to FIG. 4, the planarization layer 127 has a second top wall 1271 facing the liquid crystal layer 130. The second top wall 1271 is provided thereon with a second raised block 1272. The second raised block 1272 projects in a direction toward the liquid crystal layer 130. The second raised block 1272 has a second circumferential surface 1273 connected to the second top wall 1271. The polarization layer 126 and the transparent conductive film layer 125 are set on and cover the second circumferential surface 1273 to form the protrusion structure 123. Specifically, the polarization layer 126 is set on and covers the second circumferential surface 1273, and the transparent conductive film layer 125 is set on and covers the polarization layer 126. In other words, the protrusion structure 123 is made up of the second raised block 1272 and the polarization layer 126 and the transparent conductive film layer 125 that are arranged on the second circumferential surface 1273 of the second raised block 1272.

Optionally, the second raised block 1272 can be made of a material that is the same as or different from a material of the polarization layer 126. The planarization layer 127 is formed of a material comprising an inorganic material (such as silicon oxide, silicon nitride, silicon oxynitride, other suitable materials, or a stacked layer of at least two of the above), an organic material (such as polyester (PET), polyolefin, polyacrylamide, polycarbonate, polysiloxane, polystyrene, polyether, polyketide, polyol, polyaldehyde, or other suitable materials, or a combination thereof), or other suitable materials, or a combination thereof.

For the second raised block 1272 and the planarization layer 127 being made of the same material, the second raised block 1272 can be formed in a process of manufacturing the planarization layer 127 to provide a patterned planarization layer 127. With the basic structure of the color filter layer 110, a transparent photoresist structure having inconsistent heights is formed on the color filter layer 110 and the height-inconsistent transparent photoresist structure can be formed with a photolithographic operation, such that a planarization layer 127 that includes a second raised block 1272 can be formed.

Optionally, referring to FIG. 1, the display panel 100 further comprises a base plate 170. The color filter layer 110 is arranged on the base plate 170. A patterned optical film 160 can be arranged between the color filter layer 110 and the base plate 170. Since red/green quantum dot materials rely on excitation by short wavelength, such as blue backlighting exciting red/green quantum dots, and such excitation caused conversion does not have an efficiency of 100%, it is necessary to subject the light passing through the color filter layer 110 to filtration. The patterned optical film 160 may help remove a component of blue light short wave projecting out of red/green color filter layer 110.

The embodiments of this application also provide a display device, which comprises a display panel 100 according to any one of the above embodiments. The display device could be any electronic equipment that includes the display panel 100, such as a liquid crystal television, a mobile phone, a personal digital assistant (PDA), a digital camera, a computer display, or a notebook computer screen.

Embodiments of this application provides a display device, in which a protrusion structure 123 is arranged at a location corresponding to the blue sub-pixel zone 111 and the protrusion structure 123 occupies a certain amount of the thickness of the liquid crystal layer 130 so that the cell thickness of the liquid crystal layer 130 to which the blue sub-pixel zone 111 corresponds to is smaller than the cell thicknesses of the liquid crystal layer 130 to which the red sub-pixel zone 113 and the green sub-pixel zone 112 correspond to, whereby the issue of viewing angle related color shifting of the blue sub-pixel zone 111 can be improved. Further, electroluminescence of the quantum dot materials of the red sub-pixel zone 113 and the green sub-pixel zone 112 is random so as to improve the issues of viewing angle related color shifting of the display device and improve image quality of the display device. Further, reducing the cell thickness of the liquid crystal layer 130 corresponding to the blue sub-pixel zone 111 would reduce transmittance of the blue light in the liquid crystal layer 130 so as to, one the one hand, reduce the amount of mixture of the blue light in the red sub-pixel zone 113 and the green sub-pixel zone 112 to further improve the issue of viewing angle related color shifting, and on the other hand, also to reduce the intensity of the blue light projecting from the display panel 100 in a front view to reduce damage caused on the eyes of the user by the blue light.

In summary, although the above disclosure provides the preferred embodiments of this application, the preferred embodiments are not intended to limit this application. For those having ordinary skills in the art, various changes and modifications are available without departing from the sprit and scope of this application. Thus, the scope of protection of this application is only determined by the appended claims.

What is claimed is:

1. A display panel, comprising, arranged as a stack, a color filter layer, a function layer, and a liquid crystal layer, wherein the function layer has a top and a bottom that are opposite to each other; the color filter layer is arranged on the top, and the color filter layer comprises a blue sub-pixel zone for transmission of blue light and at least one non-blue sub-pixel zone; the liquid crystal layer is arranged on the bottom; the bottom is provided with a protrusion structure, and the protrusion structure extends into the liquid crystal layer such that the protrusion structure divides the liquid crystal layer into a first area and a second area, the first area having a projection cast on the color filter layer and having an area covering the blue sub-pixel zone, the second area corresponding to the at least one non-blue sub-pixel zone, a liquid crystal cell thickness of the first area being smaller than a liquid crystal cell thickness of the second area, wherein the liquid crystal cell thickness of the first area that covers the blue sub-pixel zone is 0.2-0.5 times of the liquid crystal cell thickness of the second area that corresponds to the at least one non-blue sub-pixel zone.

2. The display panel according to claim 1, wherein the protrusion structure comprises a light transmitting structure for transmission of blue light therethrough.

3. The display panel according to claim 1, wherein the first area has a projection cast on the color filter layer and having a surface area corresponding to a surface area of the blue sub-pixel zone.

4. The display panel according to claim 1, wherein the function layer comprises a transparent conductive film layer, and the transparent conductive film layer is arranged on one side adjacent to the liquid crystal layer, the protrusion structure and the transparent conductive film layer being made of the same material.

5. The display panel according to claim 1, wherein the function layer further comprises a polarization layer, and the polarization layer has a first top wall facing the liquid crystal layer, the first top wall being provided thereon with a first raised block, the first raised block extending toward the liquid crystal layer, the first raised block having a first circumferential surface connected to the first top wall, the function layer further comprising a transparent conductive film layer, the transparent conductive film layer being set on and covering the first circumferential surface to form the protrusion structure.

6. The display panel according to claim 1, wherein the function layer further comprises a planarization layer, and the planarization layer comprises as second top wall facing the liquid crystal layer, the second top wall being provided thereon with a second raised block, the second raised block extending toward the liquid crystal layer, the second raised block having a second circumferential surface connected to the second top wall, the function layer further comprising, arranged as a stack, a transparent conductive film layer and a polarization layer, the polarization layer covering the second circumferential surface, the transparent conductive film layer covering the polarization layer to form the protrusion structure.

7. The display panel according to claim 1, wherein the at least one non-blue sub-pixel zone of the color filter layer comprises a green sub-pixel zone and a red sub-pixel zone, the green sub-pixel zone being filled with a first quantum dot material, such that the first quantum dot material, upon excitation by the blue light, emits green light, the red sub-pixel zone being filled with a second quantum dot material, such that the second quantum dot material, upon excitation by the blue light, emits red light.

8. The display panel according to claim 7, wherein the display panel further comprises a thin-film transistor layer and a backlight source, the thin-film transistor layer being arranged on one side of the liquid crystal layer that is distant from the function layer, the backlight source being arranged on one side of the thin-film transistor layer that is distant from the liquid crystal layer, the backlight source emitting the blue light.

9. A display device, comprising a display panel, the display panel comprising, arranged as a stack, a color filter layer, a function layer, and a liquid crystal layer, wherein the function layer has a top and a bottom that are opposite to each other; the color filter layer is arranged on the top, and the color filter layer comprises a blue sub-pixel zone for transmission of blue light and at least one non-blue sub-pixel zone; the liquid crystal layer is arranged on the bottom; the bottom is provided with a protrusion structure, and the protrusion structure extends into the liquid crystal layer such that the protrusion structure divides the liquid crystal layer into a first area and a second area, the first area having a projection cast on the color filter layer and having an area covering the blue sub-pixel zone, the second area corresponding to the at least one non-blue sub-pixel zone, a liquid crystal cell thickness of the first area being smaller than a liquid crystal cell thickness of the second area, wherein the liquid crystal cell thickness of the first area that covers the blue sub-pixel zone is 0.2-0.5 times of the liquid crystal cell thickness of the second area that corresponds to the at least one non-blue sub-pixel zone.

10. The display device according to claim 9, wherein the protrusion structure comprises a light transmitting structure for transmission of blue light therethrough.

11. The display device according to claim 9, wherein the first area has a projection cast on the color filter layer and having a surface area corresponding to a surface area of the blue sub-pixel zone.

12. The display device according to claim 9, wherein the function layer comprises a transparent conductive film layer, and the transparent conductive film layer is arranged on one side adjacent to the liquid crystal layer, the protrusion structure and the transparent conductive film layer being made of the same material.

13. The display device according to claim 9, wherein the function layer further comprises a polarization layer, and the polarization layer has a first top wall facing the liquid crystal layer, the first top wall being provided thereon with a first raised block, the first raised block extending toward the liquid crystal layer, the first raised block having a first circumferential surface connected to the first top wall, the function layer further comprising a transparent conductive film layer, the transparent conductive film layer being set on and covering the first circumferential surface to form the protrusion structure.

14. The display device according to claim 9, wherein the function layer further comprises a planarization layer, and the planarization layer comprises as second top wall facing the liquid crystal layer, the second top wall being provided thereon with a second raised block, the second raised block extending toward the liquid crystal layer, the second raised block having a second circumferential surface connected to the second top wall, the function layer further comprising, arranged as a stack, a transparent conductive film layer and a polarization layer, the polarization layer covering the second circumferential surface, the transparent conductive film layer covering the polarization layer to form the protrusion structure.

15. The display device according to claim 9, wherein the at least one non-blue sub-pixel zone of the color filter layer comprises a green sub-pixel zone and a red sub-pixel zone, the green sub-pixel zone being filled with a first quantum dot material, such that the first quantum dot material, upon excitation by the blue light, emits green light, the red sub-pixel zone being filled with a second quantum dot material, such that the second quantum dot material, upon excitation by the blue light, emits red light.

16. The display device according to claim 15, wherein the display panel further comprises a thin-film transistor layer and a backlight source, the thin-film transistor layer being arranged on one side of the liquid crystal layer that is distant from the function layer, the backlight source being arranged on one side of the thin-film transistor layer that is distant from the liquid crystal layer, the backlight source emitting the blue light.

* * * * *